(12) United States Patent
Stark

(10) Patent No.: US 10,863,666 B2
(45) Date of Patent: Dec. 15, 2020

(54) METHOD FOR CALIBRATION OF FEED RATE OF A METERING DEVICE AND A METERING DEVICE

(71) Applicant: Väderstad Holding AB, Väderstad (SE)

(72) Inventor: Crister Stark, Väderstad (SE)

(73) Assignee: Väderstad Holding AB, Väderstad (SE)

( * ) Notice: Subject to any disclaimer, the term of this patent is extended or adjusted under 35 U.S.C. 154(b) by 256 days.

(21) Appl. No.: 16/303,244

(22) PCT Filed: May 12, 2017

(86) PCT No.: PCT/SE2017/050479
§ 371 (c)(1),
(2) Date: Nov. 20, 2018

(87) PCT Pub. No.: WO2017/204716
PCT Pub. Date: Nov. 30, 2017

(65) Prior Publication Data
US 2019/0200514 A1    Jul. 4, 2019

(30) Foreign Application Priority Data
May 23, 2016 (SE) .................. 1650709

(51) Int. Cl.
*A01C 7/10* (2006.01)
*A01C 7/08* (2006.01)
*G01F 25/00* (2006.01)

(52) U.S. Cl.
CPC .............. *A01C 7/107* (2013.01); *A01C 7/081* (2013.01); *A01C 7/105* (2013.01); *G01F 25/0007* (2013.01)

(58) Field of Classification Search
CPC ......... A01C 7/107; A01C 7/081; A01C 7/105; A01C 7/14; A01C 7/18; A01C 7/082; A01C 7/084; A01C 7/102; G01F 25/0007
USPC ....... 73/1.16, 1.36, 861, 861.41; 377/19, 21; 111/199
See application file for complete search history.

(56) References Cited

U.S. PATENT DOCUMENTS

| | | |
|---|---|---|
| 2012/0022646 A1 | 1/2012 | Mortarino et al. |
| 2012/0036914 A1 | 2/2012 | Landphair et al. |
| 2014/0076217 A1 | 3/2014 | Liu et al. |

FOREIGN PATENT DOCUMENTS

| | | |
|---|---|---|
| EP | 2281426 A2 | 2/2011 |
| EP | 2409558 A1 | 1/2012 |
| EP | 2420121 A1 | 2/2012 |

*Primary Examiner* — Robert R Raevis
(74) *Attorney, Agent, or Firm* — Coats & Bennett PLLC

(57) ABSTRACT

A method and system for calibrating the feed rate of a metering device for airflow-borne feeding of granular material in an agricultural implement. The method of calibrating the feed rate of the metering device comprises a first volumetric feeder with a first metering rotor arranged to feed granular material to an airflow channel.

18 Claims, 2 Drawing Sheets

METHOD FOR CALIBRATION OF FEED RATE OF A METERING DEVICE AND A METERING DEVICE

Figure 1:
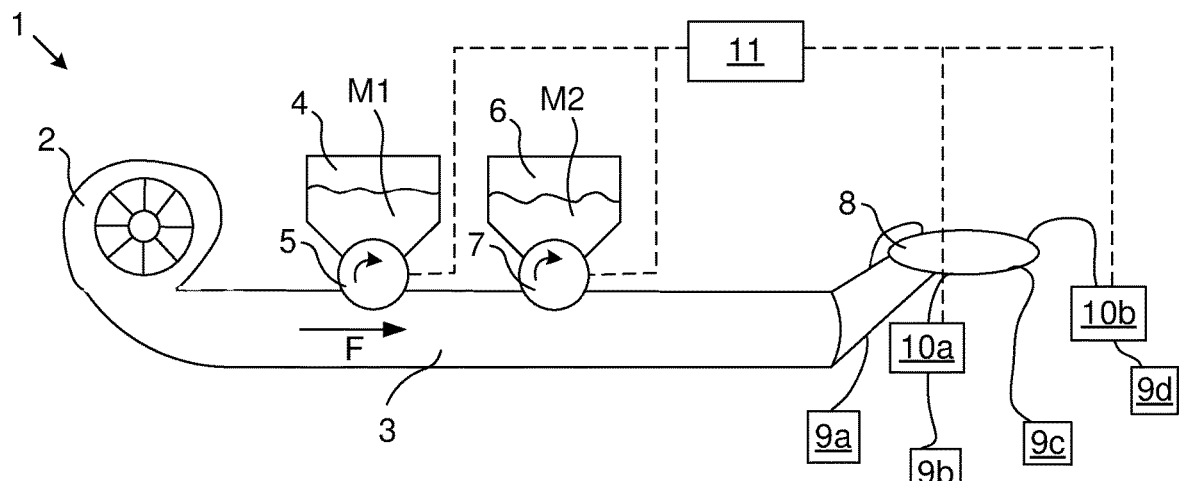

This application is a U.S. National Stage Application of PCT Application No. PCT/SE2017/050479, with an international filing date of 12 May 2017. Applicant claims priority based on Swedish Patent Application No. 1650709-7 filed 23 May 2016. The subject matter of these applications is incorporated herein.

TECHNICAL FIELD

The present document relates to a method for calibration of feed rate of a metering device for airflow-borne feeding of granular material in an agricultural implement. The method can be used in agricultural implements using airflow-borne feeding, such as seed drills.

The document also relates to a metering device for airflow-borne feeding of granular material in an agricultural implement, which metering device can be calibrated according to the abovementioned method.

BACKGROUND

It is known in agricultural implements such as seed drills to use a generated airflow to transport granular or powdered material, such as seed, fertilizer or pesticides, from a container via a distributor and onward via channels to a plurality of feeder tools, such as furrow openers, etc. A feeder with a rotor can be used to feed material from the container to the airflow. By using a feeder, the correct amount of material being fed to the airflow can be ensured.

Such volumetric feeders have previously been used together with a mechanical coupling to a blade impeller, which engages with the soil, wherein the speed of the feeder is controlled mechanically in relation to the ground.

In recent years, electrically or hydraulically driven feeders have been applied to a greater extent, providing greater freedom to control the feeder in relation to the travel speed.

Another trend is to increase the precision of the drilling, i.e. to control the amount of seed to be fed per unit area more precisely, which in turn makes it possible to optimize yield and growth.

Consequently, it is desirable to be able to calibrate the feeder, in order to ensure that the correct amount of material is fed per unit area. For example, this is the case when drilling, as it is usually desirable to ensure a certain amount of seed per unit area of e.g. a field. The desired amount of seed per unit area can depend on a plurality of parameters, such as the type of crops, the size of the granules, the soil, etc.

One way of calibrating a feeder is to use one or more sensors to count the number of granules passing one or more places in the airflow channels and then, based upon these measured values, to adjust the feed rate of the feeder so that the desired amount to be fed is reached. An example of calibrating a feeder of an agricultural implement with airflow feeding of seed can be found in US 2014/0076217.

It can be advantageous in a number of situations to also feed one or more additional products from the agricultural implement during drilling, besides the crop to be sown, so called mixed drilling. For example, a small amount of fertilizer can preferably be fed together with the seeds. In this way, the crop gets access to some extra nutrition, promoting its establishment. There may also be a reason for sowing two or more different types of crops simultaneously, such as when one crop acts as a support plant for another crop, or when it is simply desirable to sow different crops in the same field. Consequently, during mixed drilling there is a container with the crop to be sown as well as one or more additional containers containing, for example, fertilizer or some other type of additional crop. The contents from the containers are fed into a channel and transported onward using an airflow to a number of feeder tools, such as furrow openers, in order then to be distributed across the field.

One difficulty with calibration for mixed drilling is that the count of granules does not provide accurate values, since an unknown number of particles are added to the airflow. With regards to fertilizer, the particles also vary greatly in size, usually from the size of dust particles up to the size of peas. The granule mixture in the airflow means that the determination of the amount cannot be carried out by counting, since the sensors for this cannot distinguish what are granules to be counted and what are not.

Therefore, it is desirable to provide an improved calibration method and an improved device in this respect.

SUMMARY

One object is to provide an improved method for calibration of feed rate of a metering device for airflow-borne feeding of granular material in an agricultural implement, and thus an improved metering device for airflow-borne feeding of granular material in an agricultural implement.

The invention is defined by the attached independent patent claims. Embodiments are set forth in the dependent patent claims, in the description that follows and in the drawings.

According to a first aspect, a method for calibration of feed rate of a metering device for airflow-borne feeding of granular material in an agricultural implement is provided, wherein the metering device comprises a first volumetric feeder with a first metering rotor arranged to feed a first granular material to an airflow channel, the method comprising:

to drive the agricultural implement during a first time period, to drive only the first metering rotor at a first rotational speed for feeding a first granular material during the first time period, by means of a granule-counting device downstream of the first and second feeder, to count a number of fed granules in the airflow channel of the first granular material, based on the number of granules and the first rotational speed, to calculate a first feed rate of the first feeder, to drive the agricultural implement during a second time period, during the second time period, to drive the metering rotor of the first feeder so that a first predetermined granular feed rate is provided, during the second time period, to feed a second granular or powdered material by means of a second feeder to the airflow channel so that both the first and the second material are fed into the airflow channel.

By driving the agricultural implement during a first period and drive only the first metering rotor during that period, while there is no feeding from the second container to the airflow channel taking place, the first feeder can be calibrated separately. During this time period, there is only the first granular material in the airflow, ensuring that the counting of granules by the granule-counting device is accurate. There is no interference from any other material in the metering device. As a result of feedback from the granule-counting device concerning the number of fed granules in the airflow channel of the first granular material and the fact that the first rotational speed of the metering rotor is known, a calculation of a first feed rate of the first feeder can be carried out.

The granule feed rate is thus the number of fed granules of a granular material, e.g. granules/m$^2$.

After calibration during the first time period, the number of granules for a certain rotational speed is thus known, alternatively, the number of granules per step or other angular unit of the metering rotor. Additional known parameters in the calculation are the speed of the agricultural implement and the width over which the agricultural implement is feeding out.

Consequently, the rotational speed can then be set during the second time period in order to reach the desired feed rate from the first feeder.

The rotational speed of a volumetric feeder can be described as the number of pulses or steps the metering rotor should turn per distance travelled.

The predetermined granule feed rate can be pre-programmed or entered by the user. The desired value will depend on e.g. the type of crops, the desired sowing density, soil etc.

The second material can be added to the airflow channel downstream of the feeding from the first feeder but upstream of the granule-counting device, viewed in the direction of the air flow. In conventional calibration, a count of the number of granules is misleading as two materials are mixed in the airflow and the count is carried out after the addition of two materials into the airflow channel. In the method above, however, a correct calibration can thus be carried out despite the fact that a second material is added to the airflow channel after the addition of the first granular material, but before the granule-counting device, viewed in the direction of the airflow.

Material from the airflow channel can be fed via a distributor to a plurality of feeder tools of the agricultural implement. The granule count can be carried out downstream of the distributor viewed in the direction of the airflow. For example, sensors can be located on some or all of the airflow channels running between the distributor head of the distributor and the feeder tools. This results in obtaining a value as accurate as possible for the number of granules passing, since values from a plurality of sensors can be used and e.g. an average or median value of the number of granules can be calculated. An incorrect value, for example if one of the sensors stops working, does not have as much impact as if only one sensor were being used.

The method can further comprise receiving input from a user with respect to a desired change of the granule feed rate of ±10%, and adjusting the rotational speed of the metering rotor so that a change of the predetermined granule feed rate of ±10% is provided. During operation, a user can thus adjust a pre-programmed or previously entered value for a desired feed rate of a granular material which can be advantageous if, during drilling, the user discovers that an increase or reduction would be appropriate under the existing circumstances.

Furthermore, the method can comprise for the second volumetric feeder to carry out the steps:

to drive the agricultural implement during a third time period which is separate from the first and second time periods and which falls before the second time period, to drive the metering rotor of the second feeder during the third time period at a second rotational speed for feeding of a granular material, by means of the granule-counting device, to count a number of fed granules in the airflow channel of the second granular material, to calculate, based on the number of granules per unit time and the rotational speed of the second metering rotor, a feed rate of the second feeder, and during the second time period, to drive the metering rotor of the second feeder so that a second predetermined granule feed rate is provided.

In the event of the second container containing granular material, e.g. for simultaneous drilling of two different crops, the second container can thus be calibrated separately during a third time period before the first and second material are mixed in the airflow channel.

During the third time period, the second feeder can be driven while the first feeder is not driven, so that said number of fed granules only corresponds to the number of granules fed by the second feeder.

Consequently, separately measured values for the first and second feeders are obtained.

Alternatively, during the third time period, the first feeder and second feeder can both be driven, so that said number of fed granules corresponds to a sum of the number of granules fed from the first feeder and the number of granules fed from the second feeder.

Consequently, first a value corresponding to the feed rate of the first feeder is obtained, and then a value corresponding to the sum of the feed rates of the first and second feeders. Based on the sum value, the feed rate of the second feeder can be deduced.

Corresponding principles can also be applied to arrangements with three or more feeders.

In the event of the metering device further comprising a third volumetric feeder with a metering rotor arranged to feed a third granular material to the airflow channel, the method can further comprise for the third volumetric feeder to carry out the steps:

to drive the agricultural implement during a fourth time period which is separate from the first, second and third time periods and which falls before the second time period, to drive the metering rotor of the third feeder during the fourth time period at a third rotational speed for feeding of a third granular material, by means of the granule-counting device, to count a number of fed granules in the airflow channel of the third granular material, to calculate, based on the number of granules and the rotational speed of the third metering rotor, a feed rate of the third feeder, during the second time period, to drive the metering rotor of the third feeder so that a third predetermined granule feed rate is provided, and during the second time period, to feed the third granular material to the airflow channel so that both the first and the second material as well as the third material are fed into the airflow channel.

A third container can be used, for example, when drilling two different crops plus fertilizing, or when drilling three different crops. The third container is then calibrated separately during a fourth time period and thus a rotational speed for the metering rotor of the third feeder can then be set in order to obtain the desired feed rate of the third granular material.

Furthermore, additional containers feeding material to the airflow channel can be envisaged, which containers in this case are calibrated as described for the third container above.

The length of the first time period can be determined based on a measure of variation with respect to said number of fed granules in the airflow channel, preferably based on the variance during a certain period of time being below a predetermined value. Furthermore, a relationship between the travel speed and the rotational speed based on said variance can be determined. In this way, the agricultural implement is driven during such a long time period that the value from the granule-counting device can be seen to be stable and thus appropriate to use for the calibration calculation. In this way, it is possible to compensate for such variations that can occur as a result of vibrations from the travel of the agricultural implement, and/or from variations in the granules' ability to flow under the effect of gravity.

According to a second aspect, a metering device for airflow-borne feeding of granular material in an agricultural implement is provided, comprising:

a first container for a first granular material, a first volumetric feeder with a first metering rotor arranged to feed the first material from the first container to an airflow channel, a second container for a second granular or powdered material, a second volumetric feeder with a second metering rotor arranged to feed the second material from the second container to the airflow channel, the second feeder being arranged to feed the second material to the airflow channel downstream of the first feeder viewed in a direction of the airflow in the channel, and the airflow channel being arranged to lead the first and second material to a plurality of feeder tools of the agricultural implement, a granule-counting device for counting the number of granules being transported in the airflow channel, the granule-counting device being arranged downstream of the first and second feeder, and a control unit for controlling the first and second feeder, the control unit being arranged:

during a first time period, to drive only the first metering rotor at a first rotational speed, during the first time period, to collect data from the granule-counting device representing the number of granules, based on said number of fed granules and the first rotational speed of the metering rotor, to calculate a first feed rate of the first feeder, and during a second time period, to drive the first and second feeder, the first feeder being driven to provide a first predetermined granule feed rate.

The metering device can further comprise a distributor for onward transport of material from the airflow channel to the feeder tools via a plurality of airflow channels.

The granule-counting device can be arranged downstream of the distributor viewed in the direction of the airflow.

The metering device can further comprise a user interface for displaying information to a user and for receiving commands from the user. In this way, information can be displayed to the user, for example concerning the number of granules by the feeders, the number of counted granules in the airflow, the present granule feed rate, etc. The user also has the opportunity to input instructions into the metering device, for example concerning the desired granule feed rate, etc.

The control unit of the metering device can further be arranged:

during a third time period, which is separate from the first and second time period and which falls before the second time period, to drive the metering rotor of the second feeder at a second rotational speed, during the third time period, to collect data from the granule-counting device concerning the number of granules of the second granular material, based on the number of fed granules and the second rotational speed of the metering rotor, to calculate a second feed rate of the second feeder, and during the second time period, to drive the second feeder to provide a second predetermined granule feed rate of the second granular material.

In this way, the feeding is calibrated from the second container separately from the calibration of the first container, e.g. when the two containers contain two different crops to be planted.

Furthermore, the metering device can also comprise a third container for a third granular material, and a third volumetric feeder with a metering rotor arranged to feed the third granular material from the third container to the airflow channel, and the control unit being further arranged:

during a fourth time period, which is separate from the first, second and third time period and which falls before the second time period, to drive the metering rotor of the third feeder at a third rotational speed, during the fourth time period, to collect data from the granule-counting device concerning the number of granules of the third granular material, based on the number of fed granules and the third rotational speed of the metering rotor, to calculate a third feed rate of the third feeder, and during the second time period, to drive the first, second and third feeder, the third feeder being driven to provide, for the third feeder, a third predetermined granule feed rate of the third granular material.

This means that separate calibration of a third container containing granular material can be carried out.

The granule-counting device can comprise one or more sensors for counting granules in one or more places in the airflow channel and/or in the outgoing airflow channels from the distributor to the feeder tools.

The sensors register the number of granules passing, and the values from a plurality of sensors can be used to ensure as accurate results as possible.

According to a third aspect, an agricultural implement is provided, comprising a metering device as described above.

The agricultural implement can be a seed drill, a precision seed drill with a so-called nursing function, a device for spreading fertilizer or pesticides, or a combination of these.

BRIEF DESCRIPTION OF THE DRAWINGS

FIG. 1 shows a schematic representation of a metering device for feeding granular material.

FIG. 2 shows an agricultural implement comprising a metering device according to FIG. 1.

FIGS. 3*a*-3*d* show various feeding scenarios which can be provided using a system like the one of the agricultural implement in FIG. 1.

DETAILED DESCRIPTION

FIG. 1 shows a schematic view of a metering device for airflow-borne feeding of granular material in an agricultural implement. The metering device 1 comprises a first container 4 for a first granular material M1, a second container 6 for a second granular or powdered material M2. The first container connects to a first feeder 5 and the second container comprises a second feeder 7. Furthermore, the metering device 1 comprises a fan 2, an airflow channel 3 and a distributor 8. The distributor comprises a distributor head and a plurality of airflow channels leading to a plurality of feeder tools 9a-9d of the agricultural implement. The metering device 1 further comprises a granule-counting device with one or more sensors 10a, 10b and a control unit 11.

The first container 4 is connected to the airflow channel 3 via the first feeder 5. Correspondingly, the second container 6 is connected to the airflow channel 3 via the second feeder 7. The fan 2 is connected to an upstream portion of the airflow channel and a downstream portion of the airflow channel connects to the distributor 8. The distributor 8 comprises a distributor head with a plurality of outlets, each of which is connected to feeder tools 9a-9d via a respective airflow channel, e.g. in the form of a pipe or tube.

The sensors 10a, 10b of the granule-counting device are in FIG. 1 arranged in connection to/from the outgoing airflow channels of the distributor head 8.

The control unit 11 is connected to the feeders 5, 7 and to the sensors 10a, 10b of the granule-counting device.

Granular material M1 from the first container 4 is fed to the airflow channel 3 via the first feeder 5. The feeder is preferably a volumetric feeder, but can also be of a different type. Material in the container 4 mainly falls under the effect of gravity via a material inlet to the feeder 5. The feeder 5 is designed with a metering rotor, which is e.g. divided into a plurality of delimited compartments which are open along the circumference of the metering rotor, and where each compartment holds a predetermined volume. When the metering rotor rotates, material is taken from the material inlet through an inlet opening so that upwardly open compartments are filled. When the metering rotor continues to rotate, each compartment's opening turns toward the airflow channel 3, resulting in the granules therein falling down into the channel 3 by gravity.

The rotational speed of the metering rotor can be controlled using the control unit 11, bringing about an increased or reduced amount of granules being fed from the container 4 to the channel 3. For example, the feeder can be driven by a stepping motor or by a motor with controllable speed.

In the airflow channel 3, material is transported onward in the device using a generated airflow F. The airflow F is provided in a conventional way using one or more fans 2, which can be hydraulically or electrically driven. The fan generates an airflow which transports the material from the feeder 5 outlet in the airflow channel 3 to the feeder tools 9a-9d via the airflow channel 3, the distributor head and the distributor's airflow channels.

From the second container 6, a granular or powdered material M2 can be fed via a second feeder 7 to the airflow channel 3. The second container 6 can, for example, contain fertilizer to be added to the crops to be planted, or an additional crop as a complement to the granular material being fed from the first container 4, e.g. so-called "companion crop". The second feeder 7 can be of the same type as the first feeder 5 or of another type, depending on the type of material to be fed from the second container 6. The second container 6 can be located so that its material is fed downstream, in the direction of the airflow F, of the feeding from the first feeder 5. However, it could also be located so that the feeding takes place upstream of the feeding from the first container 4.

The metering device 1 in FIG. 1 also comprises a granule-counting device. The granule-counting device can comprise one or more sensors 10a, 10b for counting granules. The sensors can be located in different places in the metering device 1. Preferably, a plurality of sensors are arranged in all or some of the airflow channels leading out from the distributor head. Alternatively, or as a complement, one or more sensors can be arranged in the airflow channel 3 upstream of the distributor 8, viewed in the direction of the airflow.

The sensors used for counting granules passing in the airflow at a certain time point can, for example, be of the optical, magnetic or ultrasonic type, but it is also possible to use other types of sensors. By registering objects passing its sensing area, it is possible to obtain information on the number of granules passing a certain position per unit time.

When a plurality of sensors are used for counting, the number of granules passing per unit time can be calculated by compiling data from all the sensors, and based on this, calculating a value, e.g. an average value based on output data from all the sensors. In this way, an acceptable result of the count is ensured, even if a single sensor for some reason gives an incorrect value.

The information from the sensors 10a, 10b is sent to the control unit 11 for further processing. The control unit 11 is arranged to receive signals from the sensors 10a, 10b, to carry out calculations and to send output signals to other units, e.g. to one or more feeders 5, 7 in the metering device 1. The control unit 11 can comprise a single control unit or a plurality of interacting control units. It can also be arranged to communicate with other devices on the agricultural implement, such as a device for displaying information to a user and for receiving commands from the user. It is also conceivable that the control unit 11 is arranged to send and receive signals from units not arranged on the agricultural implement, such as a remote server for storing data, or an information unit for monitoring the status of the agricultural implement, etc.

Calibration of the feeding of the first granular material M1 from the first container 4 is carried out by the control unit 11 driving only the first feeder 5 during a first time period in order to feed granules of the first material into the airflow channel 3. The second feeder 2c of the second container 6 (and any other feeders associated with additional containers, if applicable) is not driven. The agricultural implement is driven at a first speed V1 and has a known width B over which granular material is fed. For the first granular material, there is a first predetermined feed rate per unit area TA1 which it is desirable to reach. The predetermined feed rate per unit area depends on the kind of crop involved, granule size, soil, etc. The predetermined value can be pre-programmed or is entered by the user when the agricultural implement is in use.

When the agricultural implement is driven during the first time period, the granule-counting device counts, by using one or more sensors, the number of granules passing per unit time when driving the metering rotor of the first feeder at a first rotational speed R1. This information is sent to the control unit with which calculations can be made based on the values obtained. Since the rotational speed R1 and the number of granules per unit time in the airflow are known variables, the number of granules fed per rotation or per step of the first feeder 5 can be determined.

Since the speed V and the width B (of the part of the working width of the machine being fed by the system) of the agricultural implement are also known variables, the control unit can thus, after calibration, drive the first metering rotor at a speed enabling the desired number of fed granules per unit area to be reached.

The metering device can further comprise a third container (not shown) with granular or powdered material connected to the airflow channel 3 via a third feeder. For example, sometimes it can be desirable to sow two or more crops simultaneously, or to have several containers in order to accommodate more material on the agricultural implement. It is also conceivable to include additional containers in the metering device, which are connected to the airflow channel 3.

In the event of having several containers with material, each feeder can be calibrated separately during a respective time period until its desired feeding amount per unit area for the actual material is reached.

Calibration as described above can thus be carried out for all containers with associated feeders for granular material used in the metering device. By calibrating each container separately during a certain time period, the granule-counting device is not interrupted by irrelevant particles. Instead, an accurate count of the actual granules is achieved.

It will be appreciated that calibration can be carried out by running one feeder at a time, wherein the measured value for each of the feeders is achieved.

Alternatively, the feeders can be activated sequentially, wherein each activation is followed by a measurement/count before the next feeder is activated. Each measured value will thus correspond to the sum of feedings from the active feeders.

Information can be sent within the metering device 1, as well as to and from the same, wirelessly or wired depending on the existing circumstances.

The length of the first time period can be a predetermined value, e.g. corresponding to a certain time. Alternatively, the length of the period can correspond to a certain distance and can also be dependent on the travel speed during the first time period.

As an additional alternative, the length of the time period can be dynamic, for example dependent on a measurement of the variance of the measured feed rate. The variance can then be measured in a rolling manner during a predetermined time period, e.g. 10-30 seconds, until a predetermined time average of the variance measurement is reached. For example, any form of measurement of variance or standard deviation can be used as a variance measurement.

If such a time average is not reached within a certain period of time, the procedure can be restarted, an error message provided, or the predetermined time average adjusted upward, so that greater variation is allowed.

Figure 2:
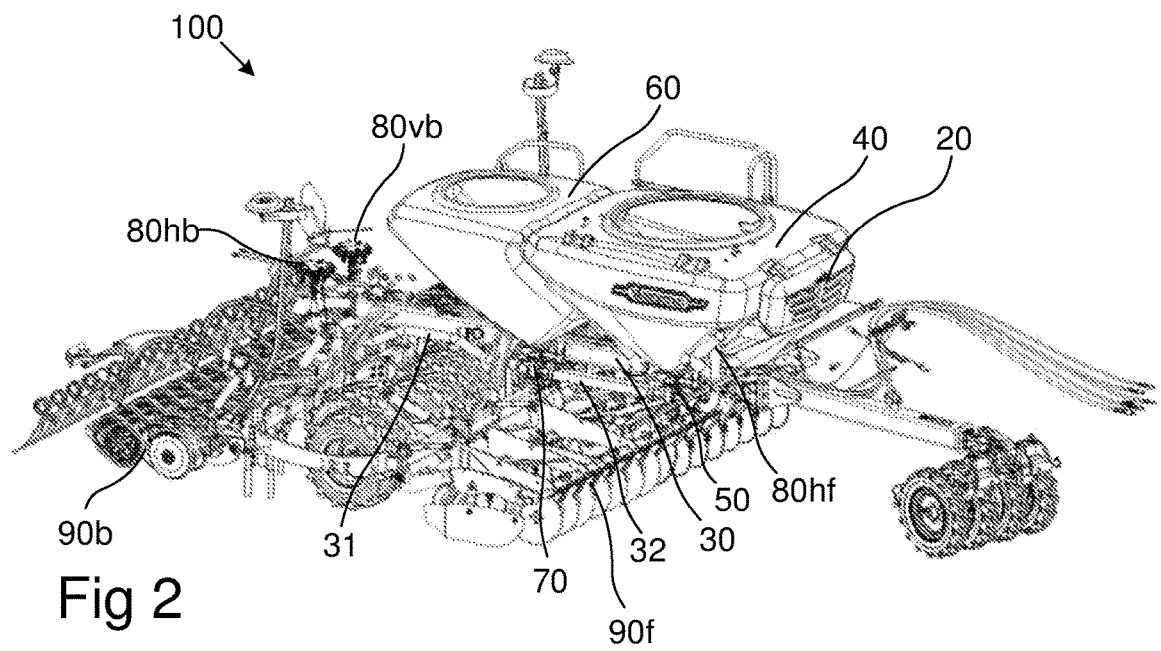

In FIG. 2, an agricultural implement 100 is shown which comprises a pair of containers 40, 60 and a pair of feed systems acting in parallel and corresponding to the description above: a right-hand feed system and a left-hand feed system.

In the example shown, both feed systems get material from both containers 40, 60. It will be appreciated that each system can have its own, separate container.

The feed system comprises a fan 20 arranged to provide an airflow according to the description above.

In the example shown, the fan feeds the airflow to a cavity inside a portion of the frame 30 of the agricultural implement.

Only the right-hand feed system is described below, and then with reference to FIGS. 3a-3d, but it will be appreciated that the left-hand feed system can be designed in an analogous way. It will also be appreciated that more than two feed systems can be provided, for example three, four or five feed systems acting in parallel.

In FIGS. 3a-3d, a first feed circuit is provided, through which a rear distributor 80b is fed, and a second feed circuit, through which a front distributor 80f is fed.

From the cavity, a first outlet 33 leads to a first channel that forms a first feed circuit. Furthermore, a second outlet 34 from the cavity leads to a second channel 32, which forms a second feed circuit.

The outlets can be provided with respective controllable valves (in a manner known per se), so that the feeding from the feeder can be led selectively to one or more alternative, or complementing, channels, making it possible to provide greater flexibility for feeding.

In the example shown, there are two containers 40, 60 (FIG. 2), and feeders 50, 70, associated with a respective container, which feeders can both feed material selectively to both channels 31, 32.

Through this arrangement, it is therefore possible to selectively provide feeding of two or more crops or materials to two or more distributors.

In the system shown, both feeders, therefore, have a respective "switch" making it possible to control the feeding from a respective feeder 50, 70 to one of two parallel channels 31, 32. In FIGS. 3a-3d, a closed outlet is indicated by "X".

In this way, it is possible to provide a number of different feeding scenarios.

Figure 3A:
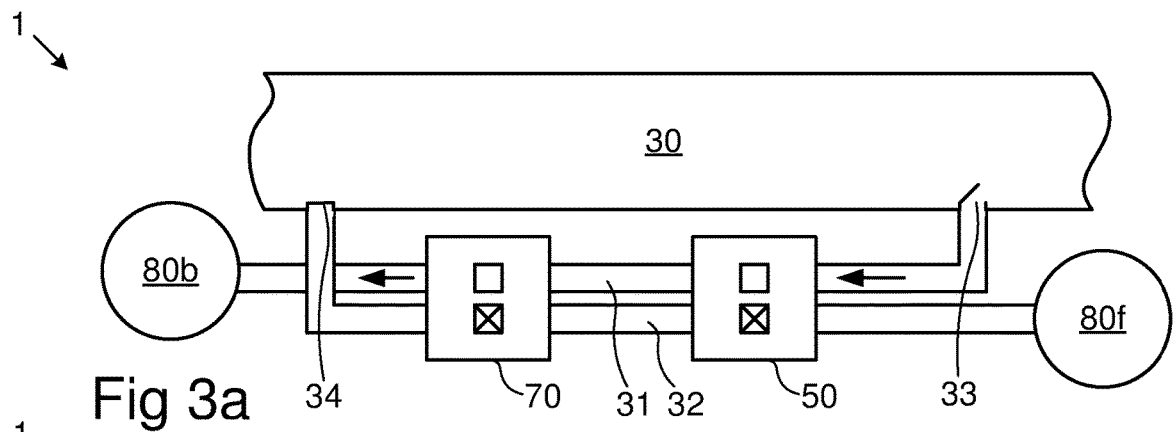

According to a first scenario, shown in FIG. 3a, only the rear furrow openers 90b are used, which furrow openers are fed via the rear distributor 80b.

In this scenario, material can be fed from the front container 40 and from the rear container 60. Both materials are then fed via the first outlets of the respective feeder to the same channel 31, while the second outlets of the respective feeder are closed. The valve controlling the supply flow 33 to the first channel 30 is open here, and the valve controlling the supply flow 34 to the second channel 32 can be closed here.

Figure 3B:
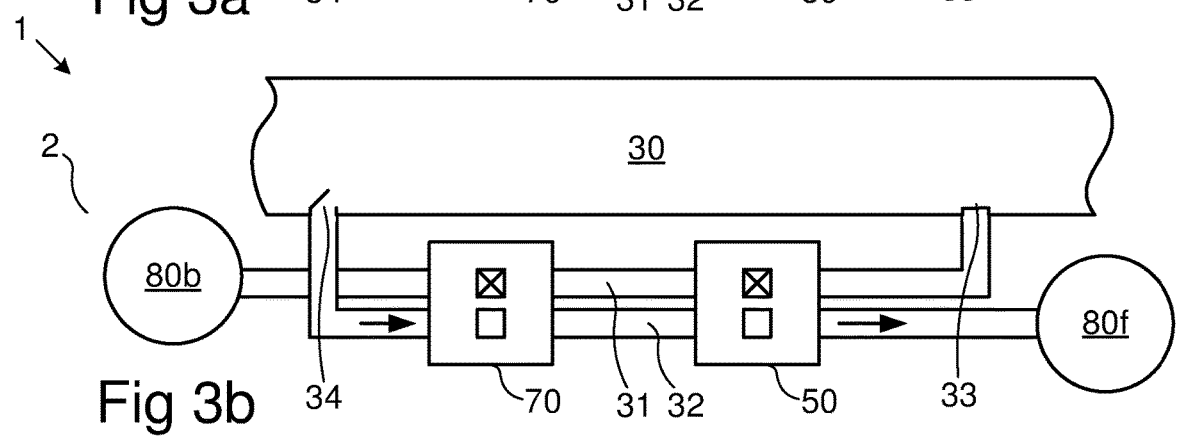

According to a second scenario, shown in FIG. 3b, only the front furrow openers are used, which furrow openers are fed via the front distributor 80f. In this scenario, material can be fed from both containers via the second channel 32, wherein the valve controlling the supply flow 34 is open, and the valve controlling the supply flow 33 to the first channel 31 can be closed.

The first outlets of both feeders are closed here, and the second outlets of both feeders are open, so that material is fed to the second channel 32.

The scenarios shown in FIGS. 3a and 3b can be used for so-called "mixed drilling".

Figure 3C:
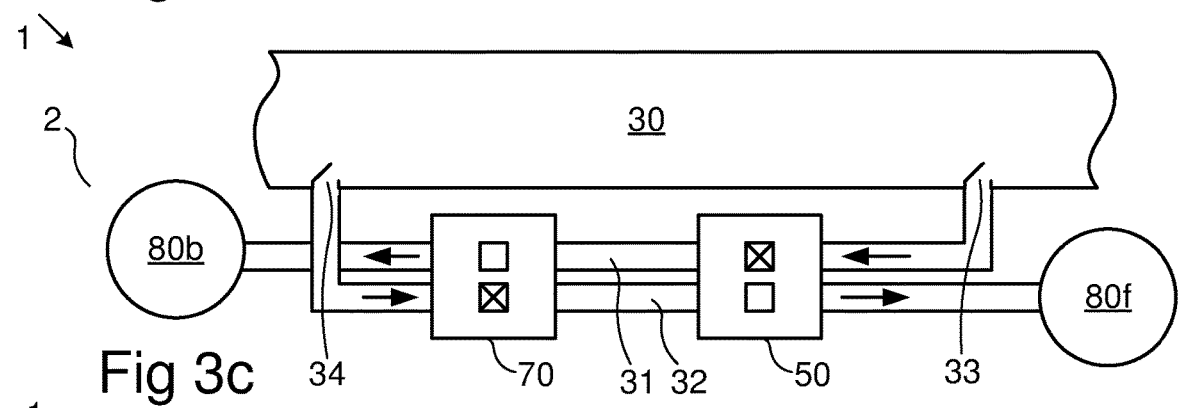

According to a third scenario, shown in FIG. 3c, both supply flows 33, 34 can be open while the first outlet of the front feeder 50 is closed and the second outlet of the rear feeder 70 is closed. Consequently, material is fed from the first feeder 50 via the rear distributor 80b to the rear furrow openers, and material from the second feeder 70 is fed via the front distributor 80f to the front furrow openers.

Figure 3D:
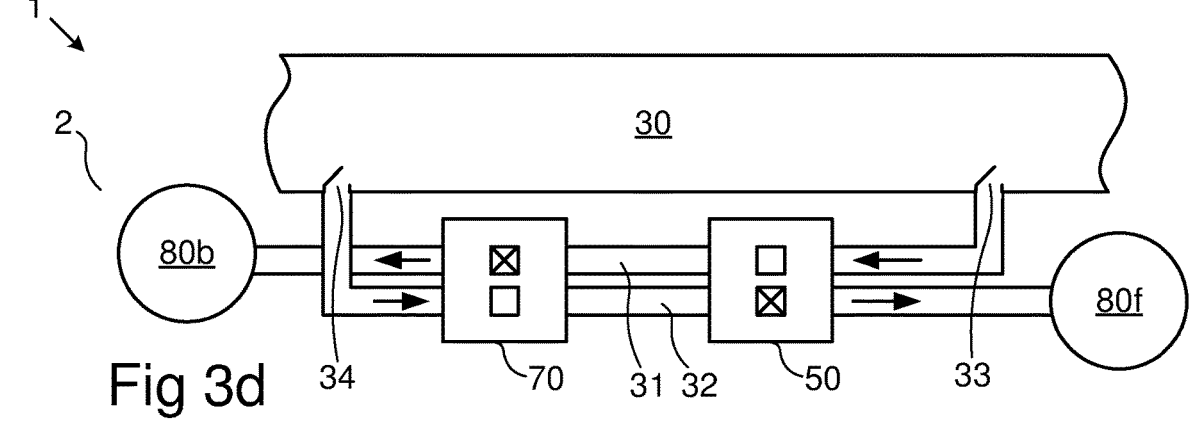

According to a fourth scenario, shown in FIG. 3d, both supply flows 33, 34 can be open while the second outlet of the front feeder 50 is closed and the first outlet of the rear feeder 70 is closed. Consequently, material is fed from the first feeder 50 via the front distributor 80f to the front furrow openers, and material from the second feeder 70 is fed via the rear distributor 80b to the rear furrow openers.

The scenarios shown in FIGS. 3c and 3d can be used for so-called "combi drilling".

For example, the material provided from the front feeder can be a main crop, and the material provided from the rear feeder can be a second material, e.g. fertilizer or a "companion crop".

It will be appreciated that the left-hand, or additional, feed system can be designed and driven in the same way.

It will also be appreciated that each feed system can comprise more than two feeders, e.g. 3, 4 or 5 feeders, sequentially feeding material to one or more airflows.

Calibration of a respective feeder can be provided in accordance with the description above, i.e. by carrying out a calibration run with granule counting for each feeder while the other feeders are turned off.

Furthermore, it will be appreciated that for feeders feeding material not suitable for counting by the granule counter, such as e.g. fertilizer or pesticides, calibration can be carried out individually, in a known manner, through a so-called tensile test.

Furthermore, it will be appreciated that even though it is not possible to count granules during operation with an acceptable accuracy, the granule-counting sensors 10a, 10b can still be used during operation in progress.

For example, the granule counters can be used to provide an indication of whether feeding is in progress or not: even though the feeders do not show the correct number of granules, they can still show that there is a flow of material in a respective line, which can also be used as an indication that the feeding is working.

Furthermore, the granule counters can be utilized to assess whether the distribution between the outgoing channels from the distributor 9, 80 is within acceptable limits, or whether a stop has occurred in any of the outgoing lines.

By providing all channels with granule counters, such an indication can be provided for all channels.

Depending on the type of material being fed, it is also possible to track the distribution for a given combination of material over time, even though an exact value of the number of granules is not provided.

The invention claimed is:

1. A method for calibration of feed rate of a metering device for airflow-borne feeding of granular material in an agricultural implement, the metering device comprising:
   a first volumetric feeder with a first metering rotor arranged to feed a first granular material to an airflow channel and
   a second volumetric feeder with a second metering rotor arranged to feed a second granular or powdered material to the airflow channel, the method comprising:
   to drive the agricultural implement during a first time period,
   to drive only the first metering rotor at a first rotational speed for feeding a first granular material during the first time period,
   by means of a granule-counting device, to count a number of fed granules in the airflow channel of the first granular material,
   based on the number of granules and the first rotational speed, to calculate a first feed rate of the first feeder,
   to drive the agricultural implement during a second time period,
   to drive the first metering rotor during the second time period so that a first predetermined granular feed rate is provided, and
   to drive the second metering rotor during the second time period so that both the first and the second material are fed into the airflow channel.

2. The method according to claim 1, wherein the second material is added to the airflow channel downstream of the feeding from the first feeder but upstream of the granule-counting device, viewed in the direction of the air flow.

3. The method according to claim 1, wherein the second material is added to the airflow channel upstream of the feeding from the first feeder but upstream of the granule-counting device, viewed in the direction of the air flow.

4. The method according to claim 1, wherein material from the airflow channel is fed via a distributor to a plurality of feeder tools of the agricultural implement.

5. The method according to claim 4, wherein said number of fed granules per unit time of the first granular material is counted downstream of the distributor viewed in the direction of the airflow.

6. The method according to claim 1, further comprising, during the second time period, to
   receive input from a user with respect to a desired change of the granular feed rate, and to
   adjust the rotational speed of the metering rotor so that a corresponding change of the predetermined granule feed rate is provided.

7. The method according to claim 1, wherein the method further comprises:
   for the second volumetric feeder to carry out the steps:
   to drive the agricultural implement during a third time period which is separate from the first and second time periods and which falls before the second time period,
   to drive the metering rotor of the second feeder during the third time period at a second rotational speed for feeding of a granular material,
   by means of the granule-counting device, to count a number of fed granules in the airflow channel of the second granular material,
   based on the number of granules per unit time and the rotational speed of the second metering rotor, to calculate a feed rate of the second feeder, and
   during the second time period, to drive the metering rotor of the second feeder so that a second predetermined granule feed rate per unit area is provided.

8. The method according to claim 7, wherein, during the third time period, the second feeder is driven while the first feeder is not driven, so that said number of fed granules only corresponds to the number of granules fed by the second feeder.

9. The method according to claim 7, wherein, during the third time period, the first feeder and second feeder are both driven, so that said number of fed granules corresponds to a sum of the number of granules fed from the first feeder and the number of granules fed from the second feeder.

10. The method according to claim 1, wherein the length of the first time period is determined based on a measure of the variation of said number of fed granules in the airflow channel.

11. The method according to claim 1, wherein, during the first time period, only the first metering rotor is driven, and wherein the granule-counting device is arranged downstream of the first and second feeder.

12. A metering device for airflow-borne feeding of granular material in an agricultural implement, comprising:
   a first container for a first granular material,
   a first volumetric feeder with a first metering rotor arranged to feed the first material from the first container to an airflow channel,
   a second container for a second granular or powdered material, a second volumetric feeder with a second metering rotor arranged to feed the second material from the second container to the airflow channel, the second feeder being arranged to feed the second material to the airflow channel, and the airflow channel being arranged to lead the first and second material to a plurality of feeder tools of the agricultural implement, a granule-counting device for counting the number of granules being transported in the airflow channel, the granule-counting device being arranged downstream of the first and second feeder, and a control unit for controlling the first and second feeder, the control unit being arranged:

during a first time period, to drive only the first metering rotor at a first rotational speed, during the first time period, to collect data from the granule-counting device representing the number of granules, based on said number of fed granules per unit time and the first rotational speed of the metering rotor, to calculate a first feed rate of the first feeder, and during a second time period, to drive the first and second feeder, the first feeder being driven to provide a first predetermined granule feed rate.

13. The metering device according to claim 12, further comprising a distributor for onward transport of material from the airflow channel to the feeder tools via a plurality of airflow channels.

14. The metering device according to claim 13, wherein the granule-counting device is arranged downstream of the distributor viewed in the direction of the airflow.

15. The metering device according to claim 12, further comprising a user interface for displaying information to a user and for receiving commands from the user.

16. The metering device according to claim 12, wherein the control unit is further arranged:

during a third time period, which is separate from the first and second time period and which falls before the second time period, to drive the metering rotor of the second feeder at a second rotational speed, during the third time period, to collect data from the granule-counting device representing the number of granules per unit time of the second material, based on the number of fed granules per unit time and the second rotational speed of the metering rotor, to calculate a second feed rate of the second feeder, and during the second time period, to drive the second feeder to provide a second predetermined granule feed rate per unit area of the second material.

17. The metering device according to claim 12, wherein the granule-counting device comprises one or more sensors for counting granules in one or more places in the airflow channel and/or in the outgoing airflow channels from the distributor to the feeder tools.

18. An agricultural implement comprising at least one metering device according to claim 12.

* * * * *